Sept. 2, 1924.

T. A. WILLARD

STORAGE BATTERY

Filed May 17, 1922

1,506,874

2 Sheets-Sheet 1

Inventor
Theodore A. Willard
by
Thurston Kivis + Hudson
attys

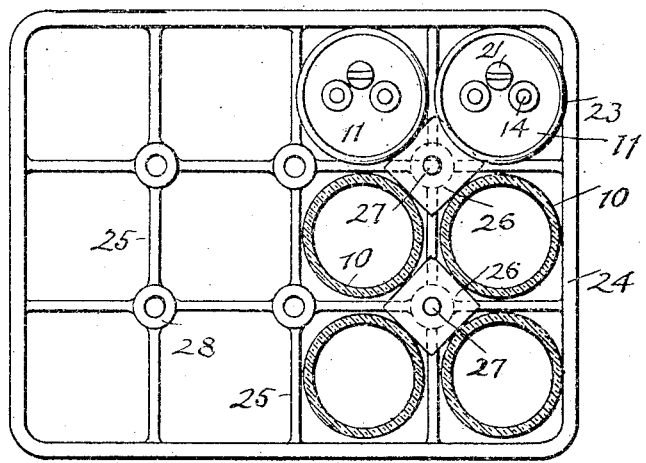
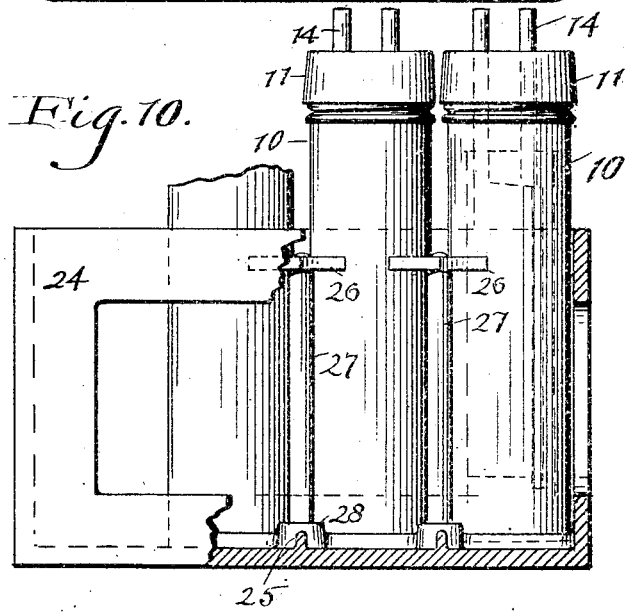

Patented Sept. 2, 1924.

1,506,874

UNITED STATES PATENT OFFICE.

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

STORAGE BATTERY.

Application filed May 17, 1922. Serial No. 561,616.

*To all whom it may concern:*

Be it known that I, THEODORE A. WILLARD, a citizen of the United States, residing at Cleveland Heights, in the county of Cuyahoga and State of Ohio, have invented a certain new and useful Improvement in Storage Batteries, of which the following is a full, clear, and exact description.

This invention relates to a storage battery adapted particularly for radio work, and has for its chief object the provision of a battery wherein the features of compactness and efficiency are obtained, and wherein leakage is minimized. Further the invention aims to provide a battery which can be produced inexpensively, and which can be readily formed in small size, with the individual cells in round containers.

The invention may be briefly summarized as consisting in certain novel details of construction, and combinations and arrangements of parts which will be described in the specifications and pointed out in the appended claims.

Figure 3:
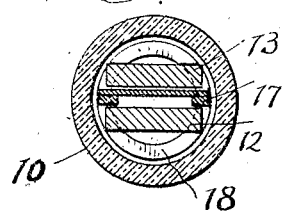
Figure 4:
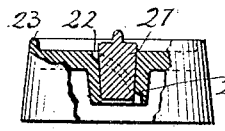
Figure 5:
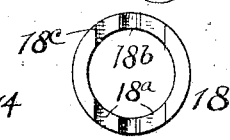
Figure 1:
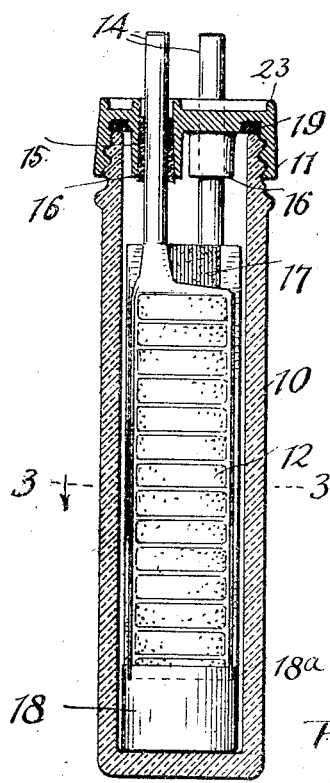
Figures 2, 6, 7:
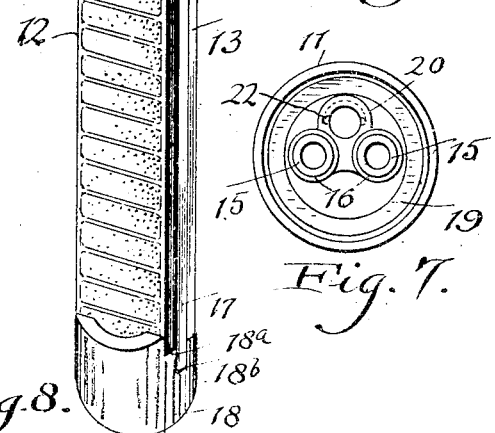
Figure 8:
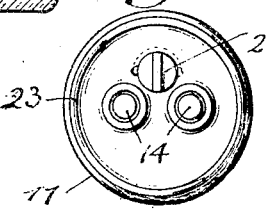

In the accompanying sheets of drawings showing the preferred embodiment of the invention, Fig. 1 is a vertical sectional view through a cell embodying my invention; Fig. 2 is a perspective view showing the cover and battery elements of one cell removed from the jar or container; Fig. 3 is a transverse sectional view substantially along the line 3—3 of Fig. 1, looking in the direction indicated by the arrows; Fig. 4 is a side view of the cover of the container with parts in section; Fig. 5 is a plan view of the bottom rest on which the plates and separator are adapted to be supported; Fig. 6 is a side view of the same; Fig. 7 is a bottom view of the jar cover; Fig. 8 is a top plan view of the same; Fig. 9 is a top plan view of a battery composed of a series of the cells grouped together in a case, part of the cells being omitted and parts being in section; and Fig. 10 is a side view of the same.

Each cell of my improved battery includes a jar or container 10 which is preferably cylindrical, and is formed of suitable insulating material, preferably glass. The top of the container is threaded to receive a threaded or screw cover 11, which is generally formed of hard rubber. Inside the container are flat positive and negative plates designated 12 and 13. These plates have terminal posts 14 which extends up through, and are tightly fixed in rubber bushings 15 tightly held in bosses 16 of the cover. Between the plates 12 and 13 is a separator 17 which may be, and preferably is, of the thread rubber type.

At the bottom of the elements, and adapted to rest on the bottom of the jar 10 is a bottom rest 18, formed of suitable insulating material such as rubber. This bottom rest is annular, as shown, and is notched out to receive the lower ends of the plates 12 and 13 and the lower end of the separator 17, the separator extending down below the lower ends of the plates into a part of the notch somewhat deeper than the parts of the notch receiving the plates. In Fig. 6 the parts of the notch receiving the plates are designated 18$^a$, and the relatively deep portion receiving the end of the separator is designated 18$^b$. Thus the parts are virtually fastened together in the form of a unit illustrated in Fig. 2, this including the cover 11, the plates 12 and 13, the separator 17 and the bottom rest 18. By notching the bottom rest 18 as described above, the lower ends of the plates are prevented by the shoulders 18$^c$ in Fig. 6 from spreading laterally. In other words, the bottom rest not only serves the usual function as a rest for the plates and separator, but holds the plates in and prevents their spreading apart in the bottom of the cell.

When the unit shown in Fig. 2 is inserted in the jar, the cover can be tightened by screwing it in place, the depending parts turning with the cover as it is tightened.

In order to provide a sealed construction, the lower side of the cover is grooved and receives a gasket 19 which is squeezed down against the top edge of the jar 10 when the cover is screwed into place.

The venting of the cell is taken care of in a novel manner, and in this instance the under side of the cover is provided in addition to the bosses 16 receiving the bushings 15 through which the terminals 14 extend, with a vent boss 20 having a tapered opening which receives a tapered plug 21 which is preferably of rubber. The wall of the opening is provided with a spiral vent groove 22 leaving a small passageway for the escape of gas around the periphery of the plug 21. By making the groove 22 in spiral form, not much acid is carried by the gas to the top of the cover, but the small bubbles are broken up before the gases reach the upper end of the spiral groove, and the acid runs back into the cell. The top of the cover is generally provided with a peripheral upstanding flange 23, and should any acid find its way through the spiral groove to the top of the cover, it will, after the battery is charged, run back into the cell through the groove 22. If desired there may be a plurality of the spiral grooves.

A series of the cells may be grouped together in any suitable fashion or arrangement in a case, which I have designated in Figs. 9 and 10 by the reference character 24. In this instance the case is in the nature of a crate having at the bottom short upstanding intersecting ribs 25 forming compartments for the lower ends of the jars 10. For the purpose of preventing contact between the jars, the latter are spaced apart by spacers 26 consisting preferably of pieces of rubber substantially square in shape and fitted onto the upper ends of stems 27 of wood or other insulating material. These stems extend down to the bottom of the case and are fitted into openings in bosses 28 at the intersection of the ribs 25. The spacers 26 keep the upper portions of the jars apart and preferably they engage the jars some distance down from the top so as to minimize leakage of current.

Cells having the construction described above can be made in small size and the requisite number to obtain a given voltage can be grouped together in a comparatively small case, making the battery a very desirable one for radio work. However, the construction can be utilized also for relatively large cells adapted for other purposes.

Having described my invention, I claim:

1. A storage battery cell comprising a container of insulating material having the top portion round in cross section, flat positive and negative plates in the container, and a cover for the container having openings through which terminals of the plates extend, said cover and container having interengaging portions whereby said cover is adapted to be fastened to the container or freed therefrom by a rotative movement, said plates being rotatable with the cover to permit the cover to be fastened to or freed from the container.

2. A storage battery cell comprising a container of insulating material having a threaded top portion, a cover adapted to be screwed thereon, and flat positive and negative plates within the container having terminals extending through the cover and fitted tightly therein, said plates being rotatable with the cover to permit the cover to be screwed on or off the container.

3. A storage battery comprising a container round in cross-section and having a cover adapted to be detached by a rotative movement containing positive and negative plates rotatable with the cover, and a bottom rest for the plates notched out to receive the lower ends of the plates, said bottom rest being rotatably supported in the container.

4. A storage battery comprising a container having positive and negative plates with insulation between them, and an insulating member beneath the plates having a notch of sufficient width to receive the lower ends of the plates and insulation and serving to prevent separation thereof.

5. A storage battery comprising a container having flat positive and negative plates, a separator between the plates, and a bottom rest in the container notched out to receive the lower ends of the plates and separator, with the middle of the notch deeper than the side portions so as to allow the separator to extend below the plates.

6. A storage battery comprising a container having battery elements, a cover fitted to the top of the container, said cover having a vent opening with a groove in the wall of the opening extending from the inner to the outer side of the cover, and a vent plug fitted into the opening.

7. A storage battery comprising a container having battery elements, a cover for the top of the container having openings for terminals and having a vent opening, and a plug fitted into the opening, the plug and opening having smooth contacting surfaces there being a groove between the plug and wall forming the opening for the escape of gas.

8. A storage battery comprising a container having battery elements, a cover for the top of the container having openings for terminals and having a vent opening, and a plug fitted into the opening, the opening and plug having smooth contacting surfaces there being a spiral groove between the plug and wall forming the opening for the escape of gas.

9. A storage battery comprising a container having battery elements and provided at the top thereof with a cover having openings for terminals and having also a tapered vent opening, said vent opening having a spiral groove, and a smooth tapered plug fitted into the opening.

10. A storage battery comprising a case having a plurality of cells, and spacers for the cells engaging the latter and arranged between groups of the latter and engaging them at a distance from the top.

11. A storage battery comprising a case containing a plurality of battery cells, each comprising a container, the bottom of the case having upstanding members provided with spacers arranged between a group of the containers and engaging the latter at a distance from the top thereof.

12. A storage battery comprising a case having a plurality of cells, said cells including containers projecting upwardly beyond the top of the case, and spacers between the containers and adapted to engage the containers a material distance below the tops thereof.

13. A storage battery comprising a container, enclosing positive and negative plates, and a cover having a vent opening and having openings through which plate terminals extend and are fitted, said cover having a downturned flange snugly fitted around the top portion of the container and securely held thereto by engagement therewith, and said cover having an upstanding acid retaining flange surrounding said openings.

In testimony whereof, I hereunto affix my signature.

THEODORE A. WILLARD.